(12) United States Patent
Kamiya et al.

(10) Patent No.: US 7,725,903 B2
(45) Date of Patent: May 25, 2010

(54) METHOD FOR PROVIDING EVENT TO APPLICATION, AND ELECTRONIC DEVICE USING THIS METHOD

(75) Inventors: Dai Kamiya, Tokyo (JP); Kazuhiro Yamada, Yokohama (JP); Takashi Kondo, Tokyo (JP); Naoki Yamane, Tokyo (JP); Yutaka Sumi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 1350 days.

(21) Appl. No.: 10/514,686

(22) Filed: Jun. 14, 2005

(65) Prior Publication Data

US 2005/0257149 A1 Nov. 17, 2005

(30) Foreign Application Priority Data

May 17, 2002 (JP) ............................. 2002-143607

(51) Int. Cl.
G06F 3/00 (2006.01)
G06F 9/44 (2006.01)
G06F 9/46 (2006.01)
G06F 13/00 (2006.01)

(52) U.S. Cl. ...................................... 719/318; 455/418
(58) Field of Classification Search ................. 455/558, 455/418; 719/318
See application file for complete search history.

(56) References Cited

U.S. PATENT DOCUMENTS 5,430,875 A 7/1995 Ma
7,353,044 B2 * 4/2008 Nachef ........................ 455/558

FOREIGN PATENT DOCUMENTS

| EP | 0 946 028 A2 | 9/1999 |
|---|---|---|
| EP | 1 033 644 A2 | 9/2000 |
| EP | 1 045 305 A2 | 10/2000 |
| EP | 1 104 151 A2 | 5/2001 |
| JP | S63-97157 | 6/1988 |
| JP | 6-236286 A | 8/1994 |
| JP | H11-41369 | 2/1999 |
| JP | 2000-22788 A | 1/2000 |
| JP | 2000-207372 A | 7/2000 |
| JP | 2001-333153 | 11/2001 |

(Continued)

OTHER PUBLICATIONS

Decision for Rejection issued Nov. 20, 2007 in Japanese application No. 2002-143607 (with translation).

(Continued)

*Primary Examiner*—Diem K Cao
(74) *Attorney, Agent, or Firm*—Brinks Hofer Gilson & Lione

(57) ABSTRACT

An event obtaining unit 121 obtains an event generated in an event generation unit 110 and outputs the event to the event providing unit 122. When an operation mode is mode A, the event providing unit 122 refers to an event table T1 and provides the event to an application corresponding to the event. If the event is provided to a communication AP 131, the communication AP 131 is launched prior to providing the event. On the other hand, when the operation mode is mode B, the event providing unit 122 provides the event to a Java runtime environment 140. In addition, the event providing unit 122 changes the operation mode when a switching button CB is pressed.

17 Claims, 10 Drawing Sheets

FOREIGN PATENT DOCUMENTS

JP    2003-169372    6/2003

OTHER PUBLICATIONS

Decision for Rejection of Amendment issued Nov. 20, 2007 in Japanese application No. 2002-143607 (with translation).

Office Action issued Nov. 13, 2007 in Japanese application No. 2007-128656 (with translation).

Japanese Office Action mailed Mar. 13, 2007.

EP Search Report issued Aug. 7, 2007 in EP Patent Application No. 03723393.9.

Office Action issued Aug. 21, 2007 in Japanese patent application No. 2002-143607 (with translation).

Office Action issued Oct. 12, 2007 in European patent application No. 03 723 393.9.

* cited by examiner

| EVENT | APPLICATION |
|---|---|
| PRESS OF DIAL KEY | COMMUNICATION AP 131 |
| EVENT OF COMMUNICATION UNIT 111 | COMMUNICATION AP 131 |
| EVENT OF TIMER 112 | JAVA RUNTIME ENVIRONMENT 140 |
| | |

*FIG. 14*

| | T2 |
|---|---|
| EVENT | EVENT OF TIMER 112 |
| PRESS OF DIAL KEY | WEB BROWSER 132 |
| EVENT OF COMMUNICATION UNIT 111 | JAVA RUNTIME ENVIRONMENT 140 |
| EVENT OF TIMER 112 | JAVA RUNTIME ENVIRONMENT 140 |
| | |

METHOD FOR PROVIDING EVENT TO APPLICATION, AND ELECTRONIC DEVICE USING THIS METHOD

TECHNICAL FIELD

The present invention relates to a method for providing a generated event to an application in an electronic device, which device is capable of executing only one application at a time.

BACKGROUND ART

In general, when an event caused by a user's operation or a timer interrupt is generated in an electronic device, an operating system (OS) handles the event to provide it to a running application. If an application is not running, a generated event handled by the OS will not be supplied to the application. Thus, an application is required to be activated before generation of an event that can be provided to the application, since it is not possible to provide an event to an unexecuted application.

In portable electronic devices such as a mobile phone, however, it is generally not possible to execute two or more application. Due to hardware limitations, including memory, it is not possible to transfer two or more application programs to a memory at a time. In other words, an OS of a mobile phone is not capable of executing and running more than one application at a time.

Thus, in a case where a user wishes to provide an event to an application that is not running, the user must first terminate a currently running application before executing and running the application to which the user wishes to provide the event. More specifically, a case can be considered wherein a user wishes to initiate voice communication when an application (so called "a standby application") is running, which can only be run while an any other application is not running. To do so, the user must first terminate the currently running standby application, and then press a designated key or keys to execute an application for performing voice communication. Next, the user presses a dial key, and this event (dial key input) is provided to the voice communication application.

As will be apparent from this description, it becomes necessary for a user to perform a number of manual operations, which is both time-consuming and troublesome, to terminate a currently running application so as to execute and run an application to which it is desired to provide an event (dial key input in this example).

In view of the above background, techniques have been developed for causing an OS to automatically execute predetermined users' operations. For example, when a user presses a dial key during execution of a currently running standby application, the OS automatically performs processing so as to terminate the application and execute a voice communication application, and provide the event (dial key input) to the voice communication application.

With increased functionality and complexity of mobile phones, however, such as applications for downloading content via a mobile communication network, and numerous other applications, it has become increasingly difficult to determine to which application an event is required to be provided. For example, while a dial key may be used for inputting a telephone number when a voice communication application is running, the same key may also be used for inputting a numeral when an e-mail application is running. Moreover, the same key may be used for inputting a URL when a web browser application is running. Due to the existence of a number of applications in which the key may be used, a malfunction may occur when an OS determines to which application an event (key input in this case) should be provided.

As will be apparent from the foregoing description, in an electronic device in which a limitation exists that only a single application can be run at any one time, the prior art technique for automating user inputs suffers from a problem that it may not be possible to determine to which application an event should be provided in a case that the event can potentially be applied to more than one application. Namely, it is not possible for a user to provide a generated event to an appropriate application without performing a number of manual operations, which is both time-consuming and troublesome.

DISCLOSURE OF THE INVENTION

In light of the foregoing, the present invention has been made to provide a method for providing a generated event to an appropriate application under operation of an OS which is not capable of executing multiple applications simultaneously, and also to an electronic device for using the method.

To overcome the abovementioned problem, the present invention provides an electronic device comprising: an obtaining means for obtaining an event; and a providing means for specifying an application on the basis of the event obtained by the obtaining means and a current operation mode and providing the event to the specified application, wherein a plurality of operation modes defined by a combination of one or more executable applications is provided in the providing means. In the electronic device, a generated event is provided to an appropriate application.

Further, it is possible for the electronic device to include an input means for inputting an instruction for changing an operation mode; and a switching means for changing the operation mode according to the instruction input by the input means. In this case, if an OS, which cannot execute multiple applications simultaneously, is running in the device, an event is provided to an application corresponding to an operation mode which is changed according to a user's instruction.

It is to be noted that an event in this case is, for example, pressing a dial key or executing a timer interrupt. Further, an application is, for example, a Java Application; and this application may be downloaded via a communication network to be stored in the device. The application may be executed and then run in a standby state. In a preferred embodiment, the device of the present invention includes a storage means for storing, for each mode, one or more applications, and events applicable to the applications. In this case, the providing means specifies an application referring to the storage means.

Further, it is possible for the providing means to provide an event to an application if the application is running, with the providing means first executing the application before providing the event if the application is not running.

Still further, the switching means includes a control means that enables a user to provide an instruction and which cyclically changes an operation mode when operated. It is possible to change outward appearances of the control means when it is operated. The control means can be, for example, a toggle button. The toggle button can further be a virtual button.

Still further, it is possible to include in the device a notifying means for notifying a user of a current operation mode. For example, the device can be configured to display a current operation mode at the top of a screen of the device.

In another aspect of the present invention, a method for providing an event to an application is provided. The method includes a specifying step of specifying an operation mode defined by a combination of one or more executable applications; an obtaining step of obtaining an event; and a providing step of identifying an application on the basis of the obtained event and the identified operation mode to provide the event to the identified application Using the method, in an electronic device in which an OS which is not capable of simultaneously executing and running multiple application programs is implemented, the event is provided to an application on the basis of an instruction.

In yet another aspect of the present invention, a computer program is provided for causing an electronic device to act as: an obtaining means for obtaining an event; a providing means for identifying an application on the basis of the event obtained by the obtaining means and a current operation mode, to provide the event to the identified application, the providing means including a plurality of operation modes defined by a combination of one or more executable applications; an input means for inputting an instruction for changing an operation mode; and an operation changing means for changing an operation mode on the basis of the instruction input by the inputting means.

In an electronic device using the program of the present invention, if an OS which is not capable of simultaneously executing and running multiple applications is implemented in the device, a generated event is provided to an application on the basis of an operation mode which is changed according to a user's instruction.

In yet another aspect of the present invention, a computer readable medium in which the above program is stored is provided.

BRIEF DESCRIPTION OF THE DRAWINGS

FIG. 14 is a conceptual diagram showing an example of an event table T2 stored in the mobile phone 2.

PREFERRED EMBODIMENTS

Embodiments of the present invention will now be described with reference to the drawings.

Figure 1:
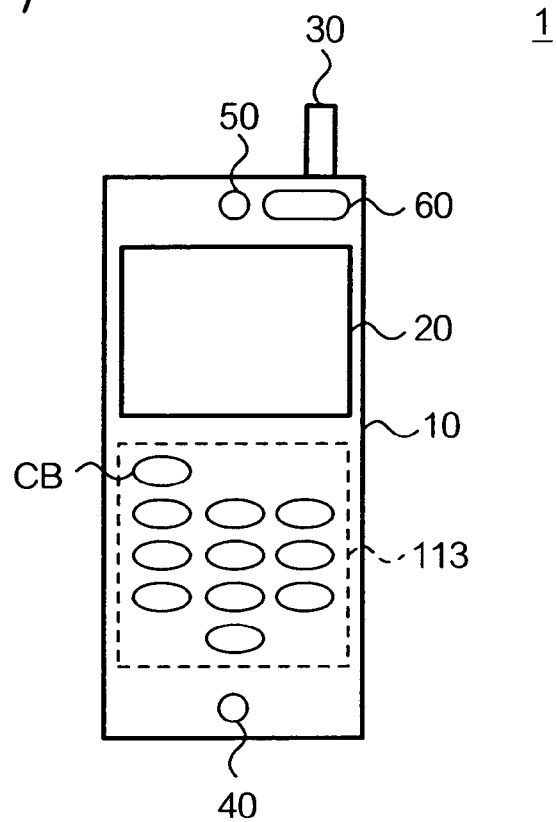
FIG. 1 illustrates an external view of an electronic device (a mobile phone 1) based on a first embodiment of the present invention.

FIG. 1 shows an aspect of an electronic device based on the first embodiment of the present invention. In this embodiment, the electronic device is a mobile phone 1 which is used in a mobile communication network. The mobile phone 1 includes a body 10 for being gripped by a user, an antenna 30 for facilitating wireless communication with a base station of the mobile communication network, a mouthpiece 40 and an ear piece 50 which are used for voice communication, a speaker 60 for generating a sound including an alarm, a control 113 for facilitating input operations by the user, and a vibrator for vibrating the body 10 (not shown in the figure).

The display 20 includes, for example, a liquid crystal EL (electro luminescence) display panel, together with related components suitable for portable devices. The control 113 includes dial keys "0" through "9" and a switching button CB. When the control is operated by a user, an event corresponding to the operation is generated. The switching button CB is used for changing an operation mode between two possible operation modes of an event providing unit 122, which is described later.

Figure 2:
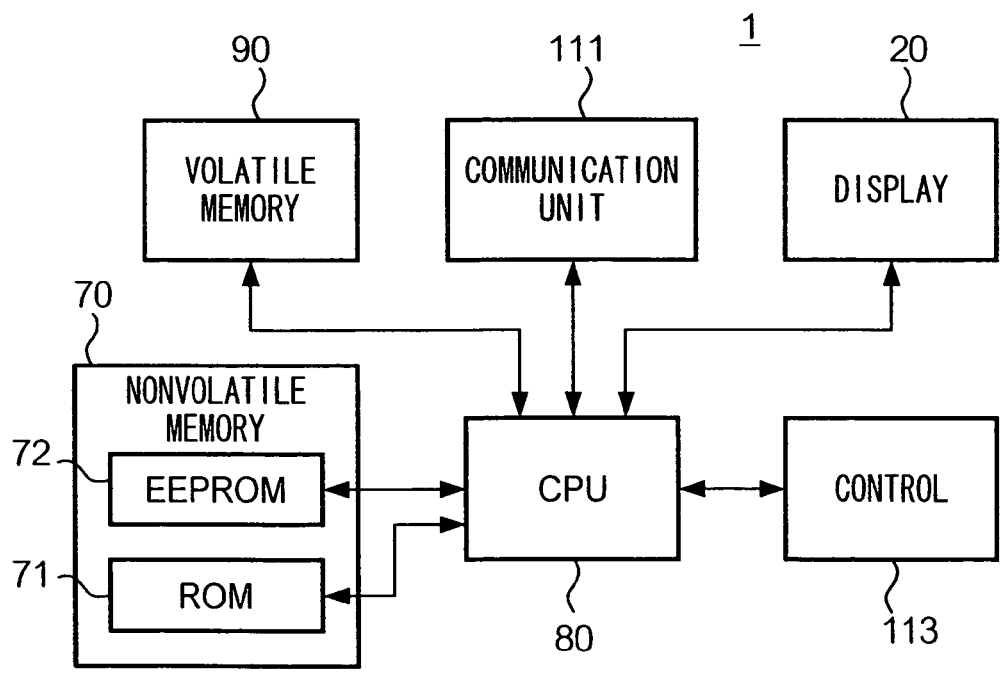
FIG. 2 is a block diagram showing an internal configuration of the mobile phone 1.

FIG. 2 is a block diagram showing an internal configuration of the mobile phone 1. As shown in the figure, the mobile phone 1 includes a nonvolatile memory 70 in which computer programs are stored, a CPU (central processing unit) 80 for executing the programs stored in the memory 70 and a volatile memory 90 such as a RAM (Random Access Memory) used by the CPU 80. The nonvolatile memory 70 includes a ROM (Read-Only Memory) 71 and an EEPROM (Electrically Erasable Programmable ROM) 72.

An OS (operation system) software program, a communication application (AP) program for performing basic functions of a phone relating to communication including voice communication, a web browser program for displaying content written in HTML (HyperText Markup Language) using HTTP (HyperText Markup Language) or HTTPS (HyperText Transfer Protocol over SSL), other programs including a Java runtime environment for executing a Java application (Java-AP) program written in Java™ programming language, an event table described later, data necessary for communication via the mobile communication network, and the like are stored in the ROM 71.

In the EEPROM 72, computer programs such as Java-AP programs for performing functions other than the basic functions of a phone, together with related data, are stored. For example, user data input by a user and computer programs downloaded by the user via the mobile communication network from a web site are stored in the EEPROM 72. The above data is retained when the mobile phone 1 is turned off.

The CPU 80 executes an OS software program stored in the nonvolatile memory 70 to control the display 20, the nonvolatile memory 70, the volatile memory 90, a communication unit 111 and the control 113. The communication unit 111 performs a communication function via the mobile communication network. The communication unit 111 includes the antenna 30 and is controlled by the communication AP which will be described in detail later.

In this embodiment, functions provided to the mobile phone 1 by the CPU 80 executing the OS software program are hereinafter referred to as "an OS". In addition, a functional unit (including at least one "process" or "thread"), launched by the OS executing a computer program is hereinafter referred to as "an application in the OS".

With the configuration described above, the mobile phone 1 is capable of performing data communication via a mobile communication network using a Web browser. For example, a user accesses a server connected to the Internet via the mobile communication network to obtain content written in HTML or to download Java-AP programs.

Figure 3:
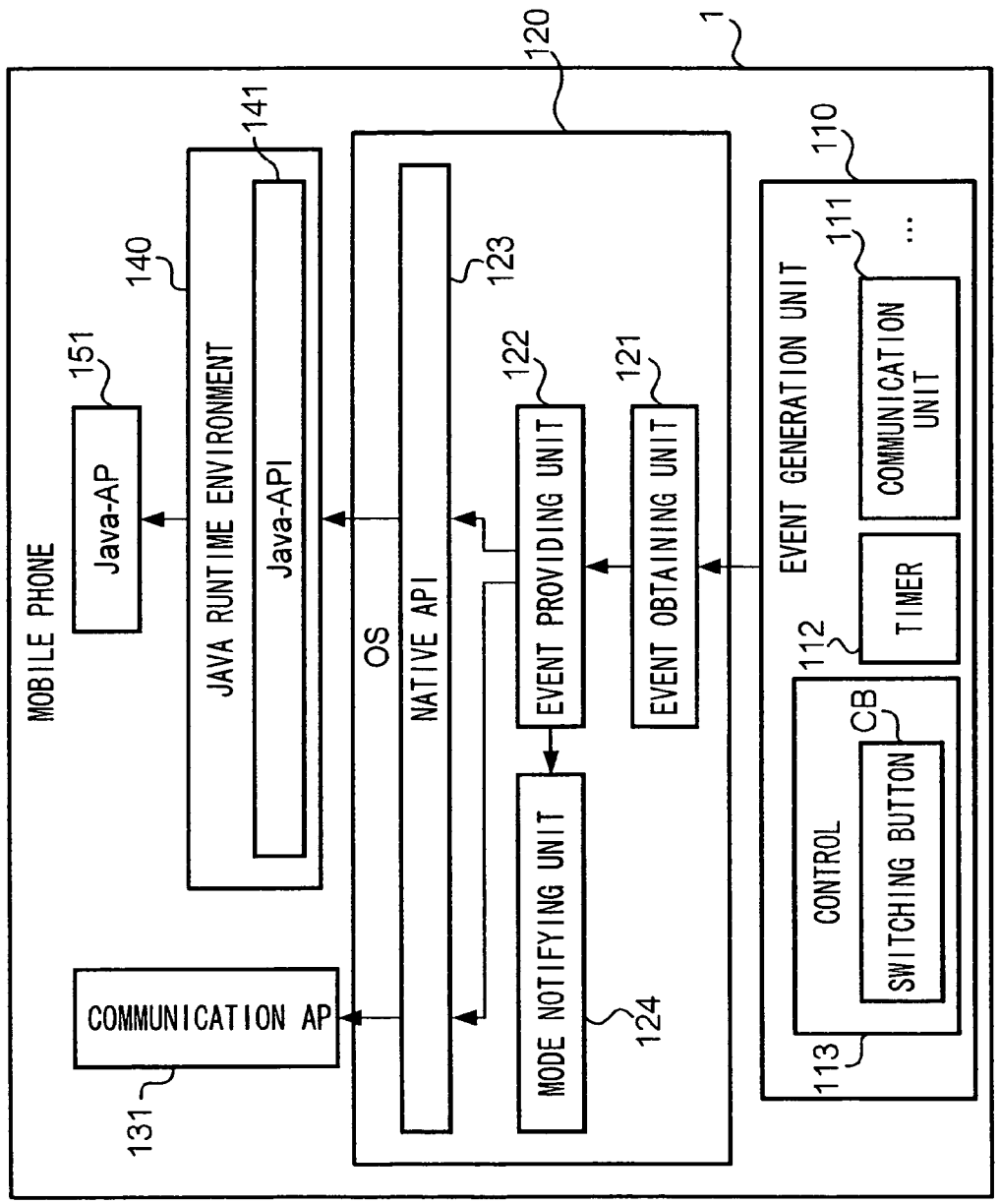
FIG. 3 is a conceptual diagram showing a functional configuration of the mobile phone 1.

FIG. 3 is a conceptual diagram showing a functional configuration of the mobile phone 1. As shown therein, an event generation unit 110 includes the communication unit 111 and a timer 112, forming a functional unit for generating an event to be provided to an OS 120 or to applications. The timer 112 generates an event at a certain time period. It is to be noted that the OS 120 cannot simultaneously execute multiple application programs. In other words, the OS 120 is limited to executing a single application program at one time. A communication AP 131 is an application running in the OS 120, and is launched with the communication AP program executed by the OS 120. Similarly, Java runtime environment 140 is an application in the OS 120, and is launched when the OS executes the Java runtime environment software.

A Java-AP 151 is an application in the Java runtime environment 140, and can be launched when the Java-AP program corresponding to the Java-AP 151 is executed in the mobile phone 1. It is to be noted that the Java runtime environment 140 cannot simultaneously execute multiple applications. The Java-AP program performs an alarm function when the mobile phone 1 is in a standby status.

A Java-API 141 is an application interface for enabling an application to run in the Java runtime environment 140. The Java-API 141 restricts an application to be executed using only functions permitted to be used by that application.

Figures 4, 5:
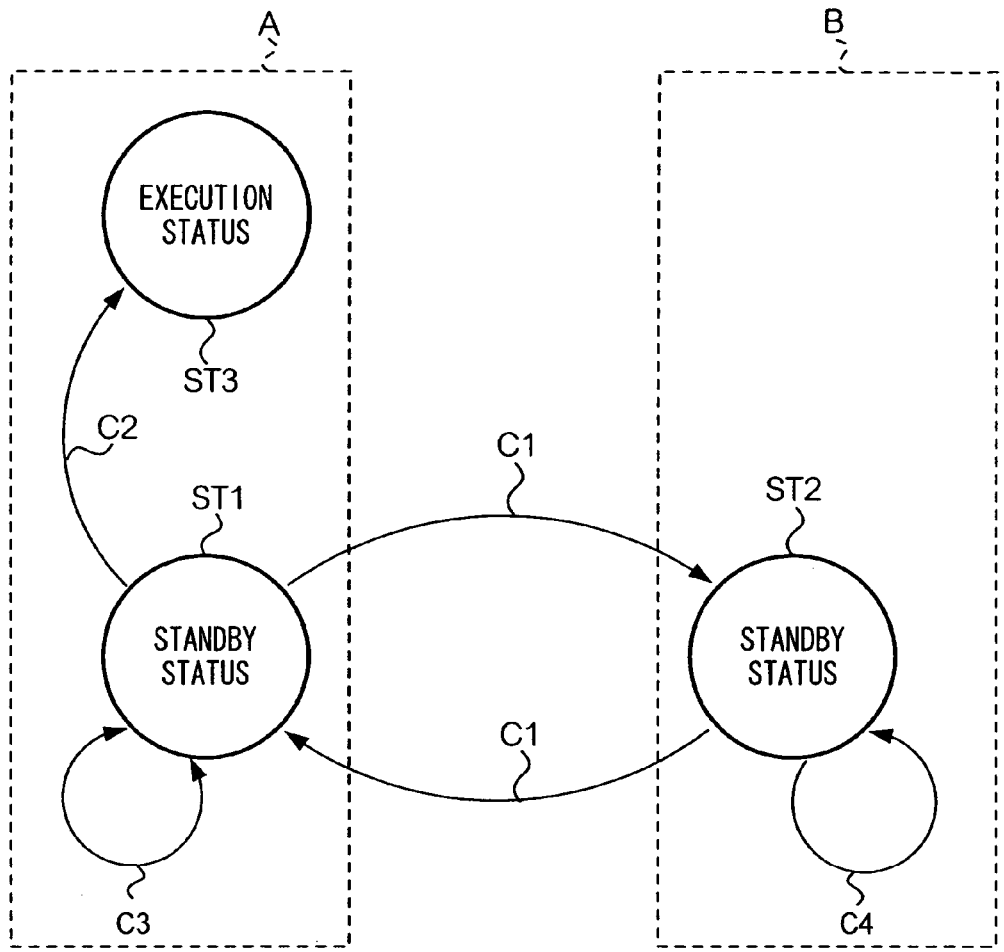
FIG. 4 illustrates a section of the status transitions performed in the mobile phone 1.
FIG. 5 is a conceptual diagram showing an example of configuration of an event table T1 stored in the mobile phone 1.

An event obtaining unit 121 and the event providing unit 122 running in the OS 120, perform a status transition shown in FIG. 4. FIG. 4 shows a section of the status transition. As shown, there are other possible statuses in the mobile phone 1, namely, standby statuses and an execution status ST3. The standby status ST1 is a status waiting for the generation of an event. The mobile phone 1 has two possible operation modes of standby statuses ST1 and ST2 corresponding to operation modes of the event providing unit 122, namely, operation modes "A" and "B". Events C1 through C4 to trigger transitions among the above statuses will be described later.

When the mobile phone 1 moves to a standby status, the OS 120 shown in FIG. 3 executes a standby application program set in advance. The standby application program is for example a Java-AP program executed in a standby status. It is possible to download the standby application program using the web browser via the mobile communication network.

The event obtaining unit 121 obtains an event generated in the event generating unit 110 and determines whether the event is an event which causes a change of a destination of the event (hereinafter referred to as a switching event). Specifically, the event obtaining unit 121 determines whether the event originated in a user's press of the switching button of the control 113.

If the event is a switching event, the event obtaining unit 121 outputs an instruction for changing an operation mode of the event providing unit 122 to the event providing unit 122. If the event is not a switching event, the event obtaining unit 121 transfers the event to the event providing unit 122.

Upon receipt of the instruction, the event providing 122 changes the current operation mode to another operation mode and outputs to a mode notifying unit 124 an instruction of notifying to the user that the operation mode has been changed (the event C1 shown in FIG. 4).

Upon receipt of the event from the event obtaining unit 121, the event providing unit 122 performs processing on the basis of the event and content of the event table T1.

FIG. 5 is a conceptual diagram showing an example of a configuration of the event table T1. As shown, the event table T1 correspondingly stores possible applications to which events can be provided by the OS 120 in a standby status and possible events which the applications can handle.

The applications stored in the table T1 include the communication AP 131, which is an application for executing a communication AP program and the Java runtime environment 140, which is an application for executing a Java runtime environment software. Applications and events are stored correspondingly in the table T1, so as to handle a generated event properly by the mobile phone 1. Specifically, an event may be associated with a single application at most. A case where an event is associated with two or more applications is possible. In this case it is possible to assign a priority to each application. Simply put, it is only required to uniquely identify a destination of generated events.

In a case where an event is provided from the event obtaining unit 121 to the event providing unit 122 when the mobile phone 1 is in a standby status, the event providing unit 122 selects an application corresponding to the event referring to the event table T1, so as to handle the event by application.

Specifically, when the selected application is not the Java runtime environment 140, the event providing unit 122 first terminates the Java runtime environment 140. Next, the event providing unit 122 launches the selected application (the communication AP 131, for example) as shown in the execution status ST3 of FIG. 4. Next, the event providing unit 122 provides the event to the launched application (event C2). When the selected application is the Java runtime environment 140, the event providing unit 122 transfers the event to the selected application (event C3).

In a case where an event is provided by the event obtaining unit 121 to the event providing unit 122 when the operation mode of the event providing unit 122 is mode B while the mobile phone 1 is in the standby status, the event providing unit 122 provides the event to the Java runtime environment 140 through a native API 123 (event C4). Next, the Java runtime environment 140 provides, via the Java-API 141, the event supplied by the OS 120 to an application running in the Java runtime environment 140.

The native API 123 is an application interface for providing an application running in the OS 120 with the functionality of the OS 120. This functionality provided to the application on the OS 120 via the application interface is restricted to a part of all the functionality, use of a part of the functionality being permitted. An application running in the OS 120 uses functionality of the OS 120 through the native API 123.

The mode notifying unit 124 displays an image which represents an operation mode of the event providing unit 122, according to an instruction supplied from the event providing unit 122. Specifically, upon receipt of a notifying instruction from the event providing unit 122, the mode notifying unit 124 displays on the display 20 an image representing mode B when a current operation mode of the event providing unit 122 is mode B. When the current operation mode is mode A, the mode notifying unit 124 stops displaying the image. In addition, the mode notifying unit 124 carries out similar display management when the mobile phone 1 moves into a standby status.

Next, an example of operations of the mobile phone 1 of the present invention will be described, referring mainly to FIG.

Figure 6:
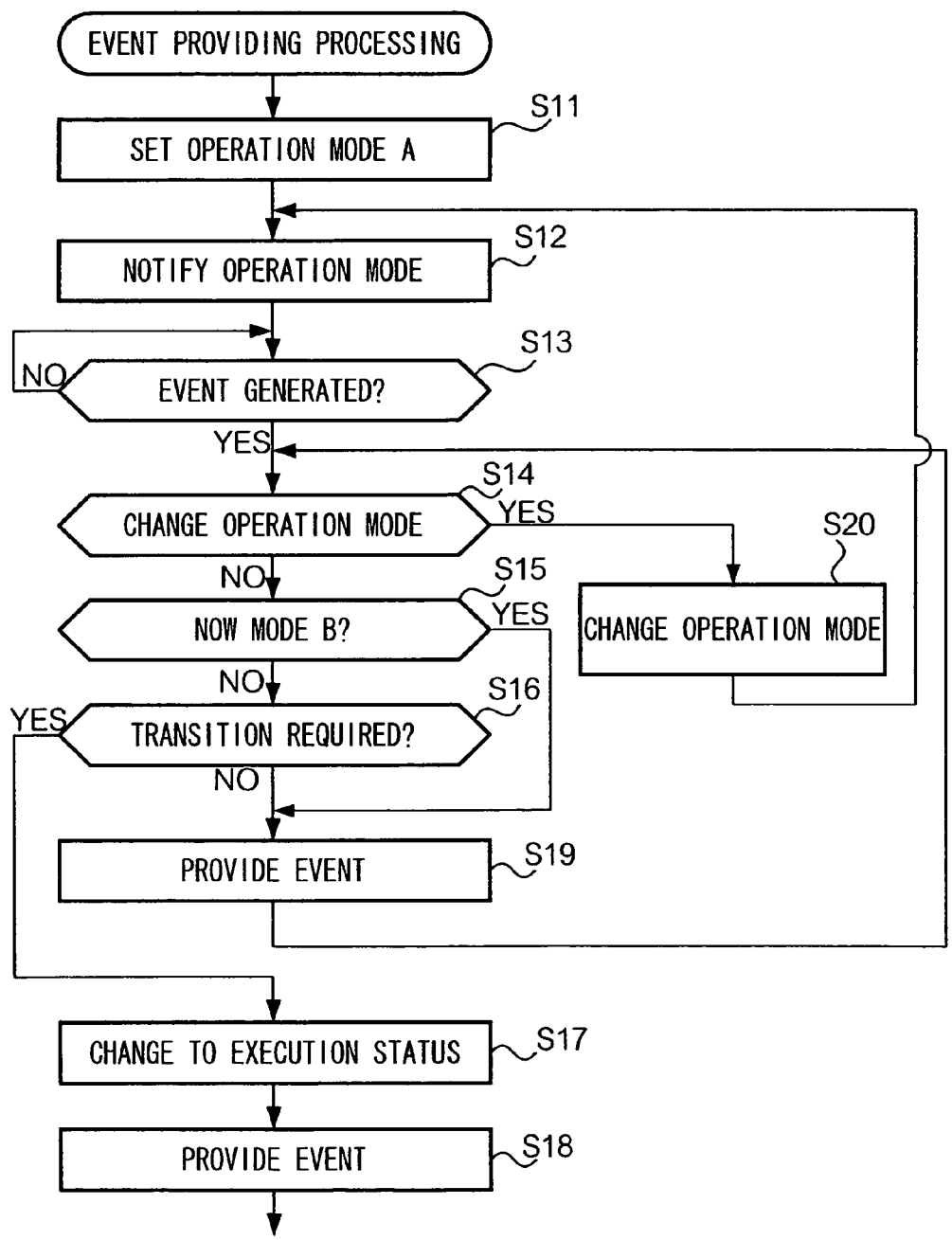
FIG. 6 is a flowchart showing an operation performed in an event obtaining unit 121, an event providing unit 122, and a mode notifying unit 124 of the mobile phone 1.

6. FIG. 6 is a flowchart showing operations that are performed by the event obtaining unit 121, the event providing unit 122, and the mode notifying unit 124 after the mobile phone 1 moves into a standby status. In the mobile phone 1 a Java-AP program corresponding to the Java-AP 151 is set as the standby application. It is assumed that the above Application program should be downloaded via the mobile communication network and that the mobile phone 1 should not have information on which event is available for the Java-AP program.

When the mobile phone 1 moves into a standby status following a user's operation, the OS 120 executes the standby application. Specifically, the Java runtime environment 140 is first executed as an application in the OS 120, and then Java-AP 151 is launched as an application in Java runtime environment 140. As a result, a user interface based on the Java-AP 151 is effected. Specifically, a certain image is displayed on the display 20, a certain sound is generated by the speaker 60, or a vibration of the mobile phone 1 is generated. Next, the operation mode of the event providing unit 122 is set to mode A (step S11).

Next, the mode notifying unit 124 notifies the user of the current operation mode of the event providing unit 122 (step S12). Since the image representing the current operation mode as being mode B is not displayed on the display 20 and the current operation mode is mode A, the mode notifying unit 124 does not perform any processing for the display 20. As a result, the user recognizes from the display 20 that the current operation mode is mode A. Hereinafter, the mobile phone 1 waits for an event to be generated.

When an event is generated in the event generation unit according to a user's operation or reception of an incoming call, the obtaining unit 121 of the OS 120 obtains the event (step S13). In the following description, it is assumed that the event should not be an event used for changing a destination of the event (step S14).

When the event obtaining unit 121 obtains the event, the obtaining unit 121 provides the event to the event providing unit 122. Upon receipt of the event, the event providing unit 122 first changes a status of the mobile phone 1 in accordance with the event, and then provides the event to an application running in the OS 120. For example, in a case where the event is a user's press of a dial key (steps S115 and S116), the event providing unit 122 first terminates the Java runtime environment 140 and then launches the communication AP 131, referring to the event table T1 in which the event is associated with communication AP 131. As a result, a status of the mobile phone 1 changes from the standby status to the execution status in which communication AP 131 is running (step S17).

Figure 7:
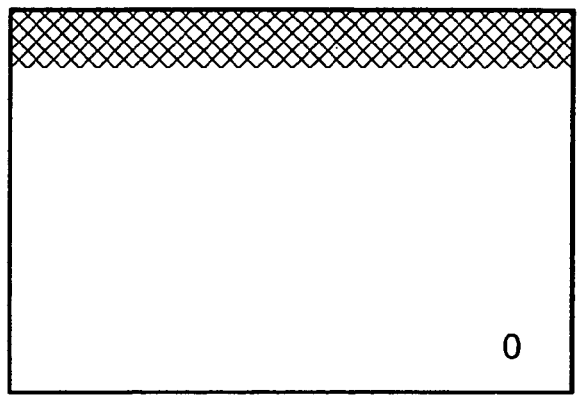
FIG. 7 shows an example of a screen displayed on a display 20 of the mobile phone 1.

While the communication AP 131 is being executed, only the communication AP 131 is running in the OS 120, thus the event is provided to the communication AP 131 via the native API 123 (step S18). As a result, a screen shown in FIG. 7 is displayed on the display 20. The operation of the communication AP 131 after the event is provided is an ordinary one, thus description thereof is omitted.

When the event is generated by the timer 112 or the like (steps S15 and S16), the event providing unit 122, which is in an operation mode A, transfers the event to the Java runtime environment 140 via the native API 123 (step S19), maintaining the status of the mobile phone 1 (standby status), since the event is associated with the Java runtime environment 140 in the event table T1.

Since only the Java-AP 151 runs on the Java runtime environment 140, the event is provided to the Java-AP151 via the Java-API 141. After that, the mobile phone 1 waits for an event to be generated. As will be apparent, when the operation mode of the event providing unit 122 is mode A, all the events associated with the Java runtime environment 140 by the event table T1 are provided to the Java-AP 151.

Now a case will be described where an event received by the event obtaining unit 121 is an event used for changing a destination of subsequent events.

Upon receipt of an event used for changing a destination of subsequent events (namely, the event generated by a user's operation of pressing the switching button CB) (steps S13 and S14), the event obtaining unit 121 outputs a switching request to the event providing unit 122. Upon receipt of the request, the event providing unit 122 changes the operation mode (now mode A) to mode B (step S20), and outputs a notifying request to the mode notifying unit 124. The mode notifying unit 124 displays on the display 20 an image representing the current operation mode as being mode B (step S12).

Figure 8:
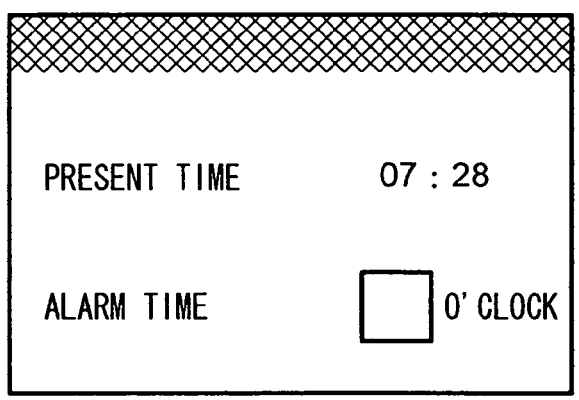
FIG. 8 shows another example of a screen displayed on the display 20.
Figure 9:
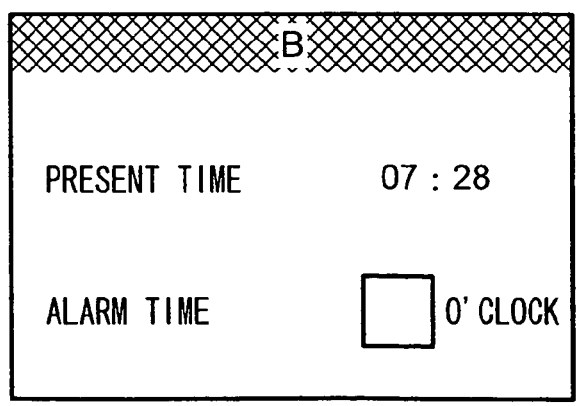
FIG. 9 shows yet another example of a screen displayed on the display 20.

As a result, a screen image of the display 20 changes from a screen shown in FIG. 8 to one shown in FIG. 9, for example. A user watching the display 20 recognizes that the current mode is mode B. As shown in FIG. 9, a character "B" is described in a region of the screen outside a region used for applications. In other words, the display of the image representing the current mode as being B is not based on an application for performing a graphics function, thereby enabling a user to clearly recognize the current mode.

When an event is generated in the event generation unit 110, the event is received by the event obtaining unit 121 (step S13). In the following description, it is assumed that the event should not be an event used for changing a destination of subsequent events (step S14).

Upon receipt of the event, the event obtaining unit 121 provides the event to the event providing unit 122. The event providing unit 122, which is in mode B, provides the event to an application running in the OS 120 (steps S15 and S19). For example, when the event is generated according to a user's operation of pressing a dial key, the event providing unit 122 provides the event to the Java runtime environment 140 via the native API 123. Next, the event is provided to the Java-AP 151, which is the only application in the Java-runtime environment 140.

Figure 10:
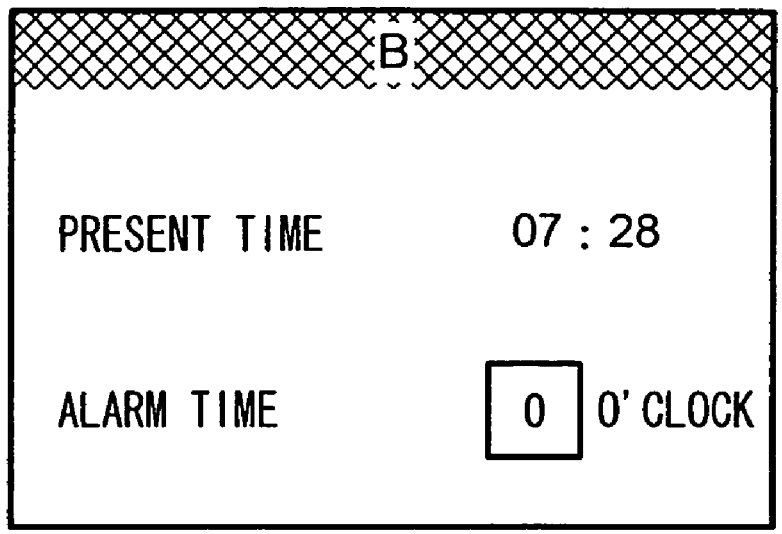
FIG. 10 shows yet another example of a screen displayed on the display 20.

It is assumed that the Java-AP 151 should be an application which performs an alarm function and that a user presses the dial key "0" when the mobile station 1 is in the standby status and in mode B. In this case, a screen shown in FIG. 10 is displayed on the display 20.

Figure 11:
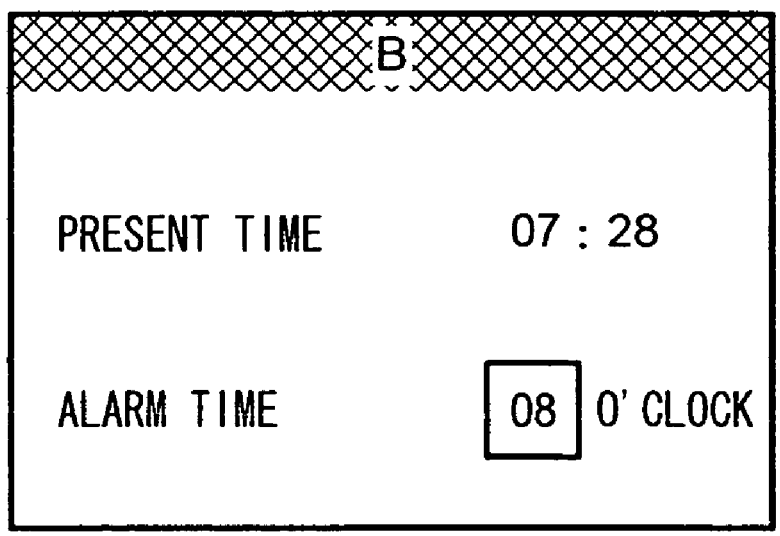
FIG. 11 shows yet another example of a screen displayed on the display 20.

After this, if the dial key "8" is pressed, the event is provided to the Java-AP 151 via the event obtaining unit 121, the event providing unit 122, the native API 123, and the Java runtime environment 140 (steps S13-S15, and S19) since the operation mode of the event providing unit 122 is mode B. As a result, a screen shown in FIG. 11 is displayed on the display 20.

After setting the timer, when the time comes, the timer 112 generates an event. In the event table T1 an event generated by the timer 112 is associated with the Java runtime environment 140, thus the event is eventually provided to the Java-AP 151 (steps S13-15, and S19). As a result, at a time displayed on the display 20 by the application, at least one of the following actions is performed: the mobile phone 1 vibrates; an alarm is generated in the speaker 60; and an image of the display 20 blinks.

When the event used for changing a destination of subsequent events is generated in the event generation unit 110, the event is received by the event obtaining unit 121 and thus the event obtaining unit 121 outputs a switching request to the event providing unit 122 (steps S13 and S14). Upon receipt of the switching request, the event providing unit 122 changes the operation mode (now mode B) to mode A (step S20) and outputs a notifying request to the mode notifying unit 124. Upon receipt of the notifying request, the mode notifying unit 124 stops displaying the image on the display 20 representing that the current operation mode is mode B (step S12).

Next, when an event associated with the communication AP 131 in the event table T1 (press of a dial key, for example) is generated, the event providing unit 122 terminates the Java runtime environment 140 and launches the communication AP 131, to change a status of the mobile phone 1 from the standby status to an execution status of the communication AP 131 (steps S13-S17). Since no other applications can run on the OS 120 during the execution of communication AP 131, the event is provided to the communication AP 131 from the event providing unit 122 via the native API 123 (step S18).

Second Embodiment

The second embodiment of the present invention will now be described with reference to the drawings. It is noted that a mobile phone based on the second embodiment (a mobile phone 2) differs from the mobile phone 1 only in the functionality of the OS. Thus, the following description is directed to the above difference.

Figure 12:
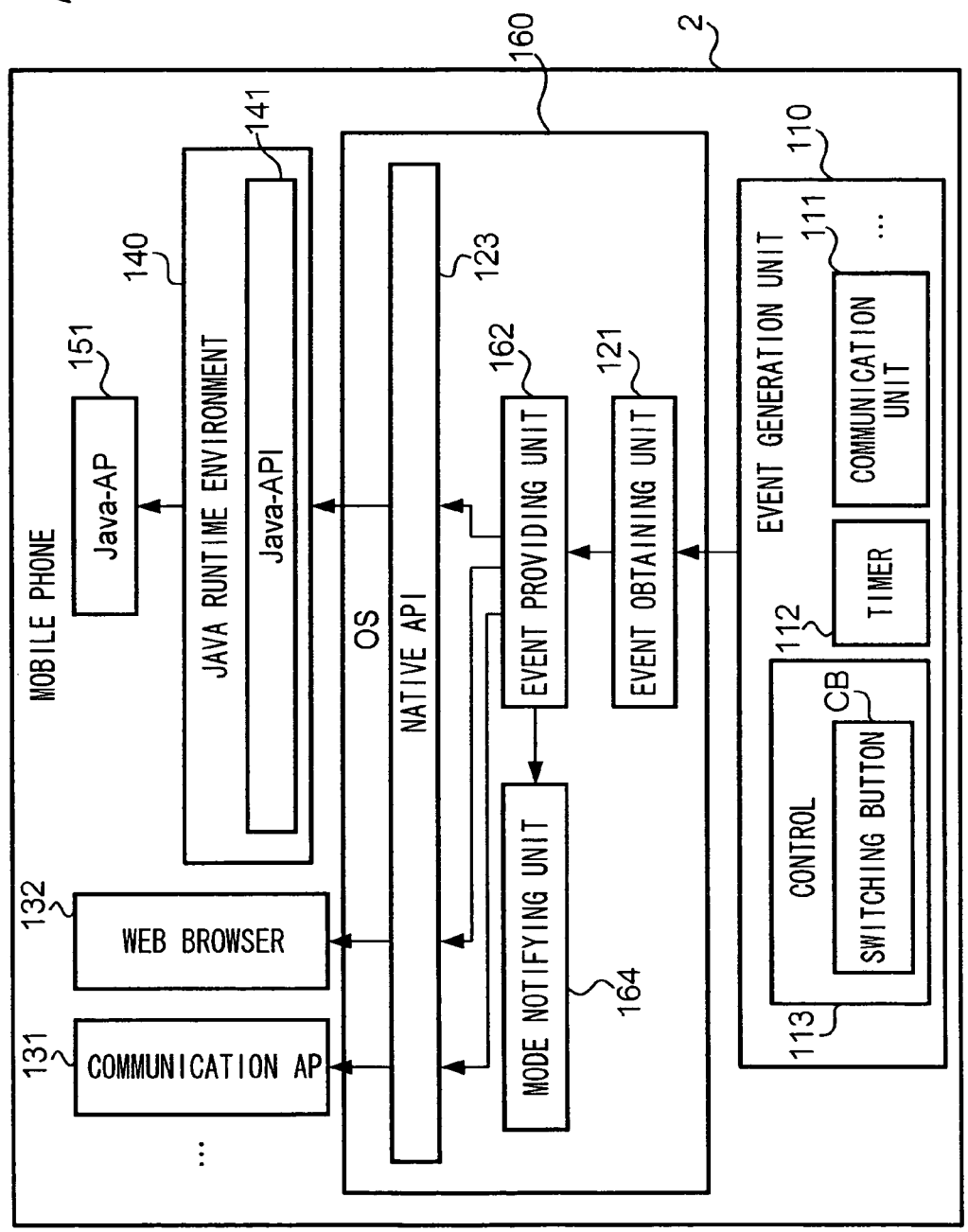
FIG. 12 is a conceptual diagram showing a functional configuration of another electronic device of the first embodiment (mobile phone 2).

FIG. 12 is a conceptual diagram showing an example of a functional configuration of the mobile phone 2. Differences between an OS 160 shown in the figure and the OS 120 shown in FIG. 3 is that in OS 160 an event providing unit 162 and mode notifying unit 164 are implemented instead of the event providing unit 122 and the mode notifying unit 124. As described above, the event providing unit 122 and the mode notifying unit 124 have mode A and mode B. On the other hand, the event providing unit 162 and the mode notifying unit 164 have mode C in addition to modes A and B which the event providing unit 122 and the mode notifying unit 124 have. Thus, the following description on the event providing unit 162 and the mode notifying unit 164 is directed to the difference in the modes. It is noted that mode C is an operation mode for providing an event to a Web browser 132, which is an application running in the OS 160 and thus launched through execution of a Web browser program. A user selects mode C so as to provide an event generated in the standby status to the Web browser 132.

Figure 13:
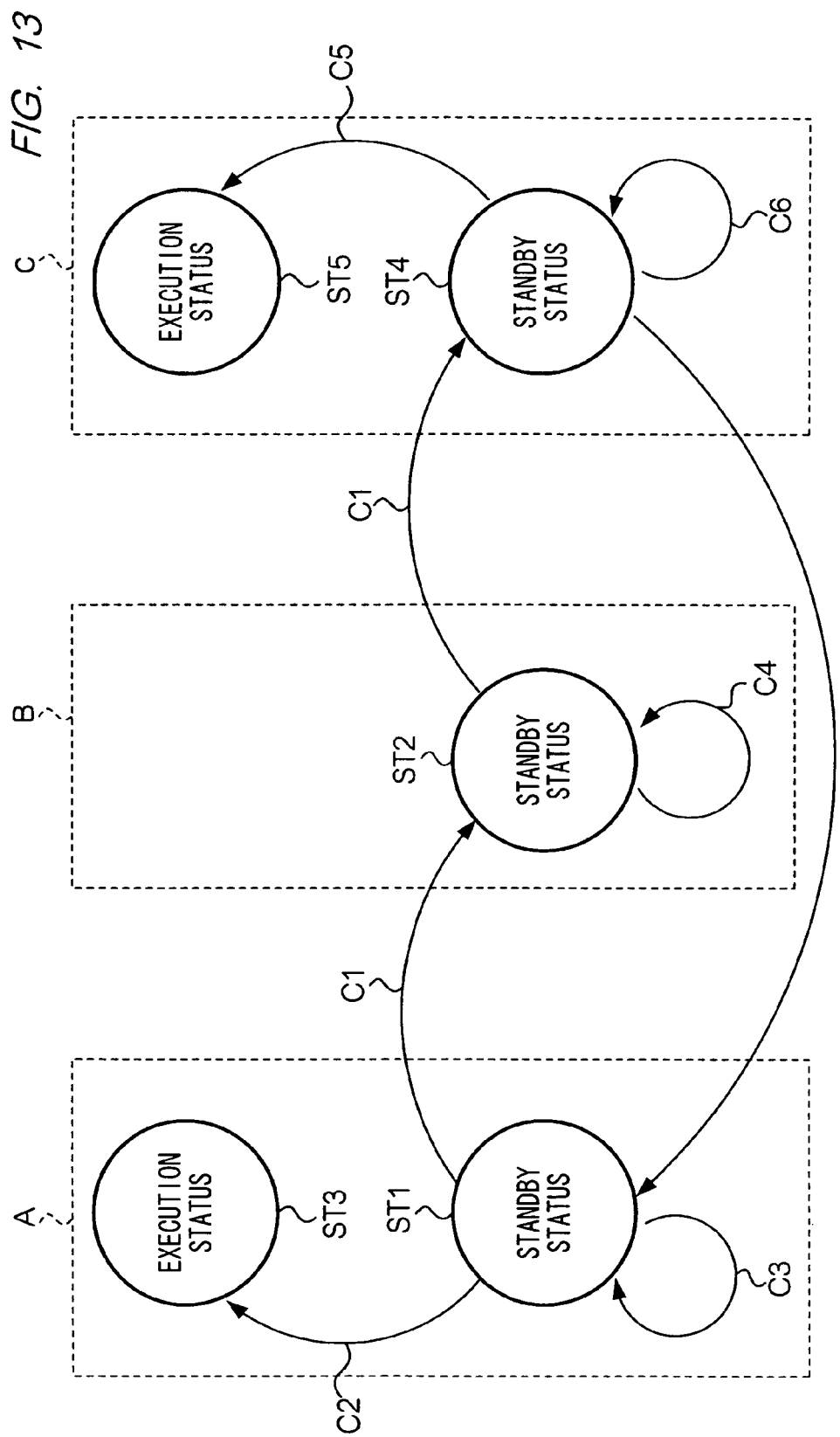
FIG. 13 illustrates a section of status transitions performed in the mobile phone 2.

The status transitions shown in FIG. 13 are effected in the OS 160 according to the event obtaining unit 121 and the event providing unit 162. FIG. 13 illustrates a section of the status transitions of the mobile phone 2. As compared to the status transitions shown in FIG. 4, the status transitions of FIG. 13 further include standby statuses ST4 and ST5. When the event providing unit 162 receives a switching request in a standby status when the switching button CB is pressed, the event providing unit 162 changes the operation mode cyclically, namely, from mode A to mode B, from mode B to mode C, from mode C to mode A, and outputs a notifying request to the mode notifying unit 164. As a result, standby statuses of the mobile phone 2 shift in the following order ST1, ST2, ST3, ST4 cyclically (event C1). Upon receipt of the event, the event providing unit 162 performs processing in compliance with the current operation mode and the event tables T1 and T2.

FIG. 14 is a conceptual diagram showing an example of the content of the event table T2. The event table stores correspondingly applications which are potential destinations of an event under control of the OS 160 in a standby status; and events to be provided to the applications. The Applications stored in the table T2 are a Web browser and a Java runtime environment. Similarly to the table T1, correspondence of the applications and the events are uniquely defined in the table T2.

In the standby status, when an event is provided from the event obtaining unit 121 to the event providing unit 162 which is in mode C, the event providing unit 162 selects an application corresponding to the event referring to the table T2, so as to enable the application to use the event. Specifically, when a selected application is not the Java runtime environment 140, the event providing unit 162 first terminates the Java runtime environment 140 and then launches the selected application. As a result, a status of the mobile phone 2 changes according to the event to become the execution status ST5 (event C5). When the selected application is the Java runtime environment 140, the event providing unit 162 transfers the event to the Java runtime environment 140 (event C6).

To summarize the above description, upon receipt of an event from the event obtaining unit 121, the event providing unit 162 provides the event to an application which is determined on the basis of the current operation mode and the event tables T1 and T2.

The mode notifying unit 164 displays an image which represents an operation mode according to a notifying request output from the event providing unit 162. Specifically, upon receipt of the notifying request from the event providing unit 162, the mode notifying unit 164 displays on the display 20 an image which represents a current operation mode of the event providing unit 162.

Figure 15:
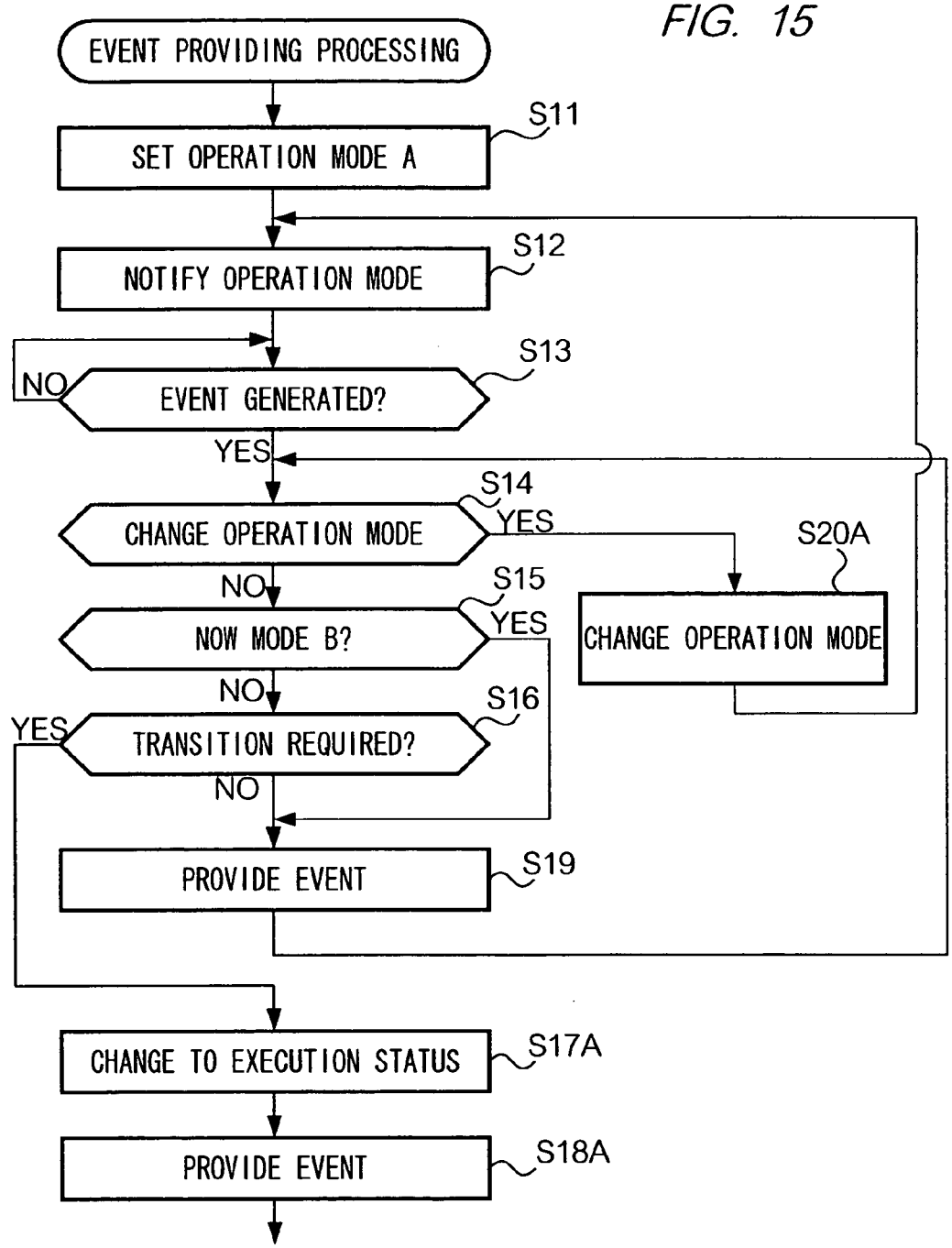
FIG. 15 is a flowchart showing an operation performed in an event obtaining unit 121, an event providing unit 162, and an operation notifying unit 164 of the mobile phone 2.

Examples of operations of the mobile phone 2 will now be described referring mainly to FIG. 15. FIG. 15 is a flowchart showing operations performed by the event obtaining unit 121, the event providing unit 162, and the mode notifying unit 164. It is noted that like numerals of FIG. 3 are assigned to like elements of FIG. 6. Explanation of operations to which same numerals as in FIG. 3 are assigned is omitted. It is also noted that in the following description, assumptions used in the first embodiment are also used in the second embodiment.

When the mobile phone 2 moves to a standby status, the notifying unit 164 notifies a user of the current operation mode of the event providing unit 162 (step S12). Specifically, the mode notifying unit 164 displays on display 20 an image representing the current operation mode of the event providing unit 164 as mode A. Thereafter, the mobile phone 2 waits for an event to be generated.

When the event obtaining unit 121 obtains an event used for a change in a destination of subsequent events (namely, user's operation of pressing the switching button), the obtaining unit 121 outputs a switching request to the event providing unit 162. The event providing unit 162 changes the operation mode to mode B and displays the image of mode B on the display 20 (steps S12, 13, 14, and 20A). Thereafter, the mobile phone 2 waits for an event to be generated.

Upon receipt of the event used for a change in a destination of subsequent events, the event obtaining unit 121 outputs a switching request to the event providing unit 162. Next, the event providing unit 162 changes the operation mode to mode C. The mode notifying unit 164 displays an image representing the current mode as being mode C on the display 20 (steps 12, 13, 14, and 20A). Thereafter, the mobile phone 2 waits for an event to be generated.

Upon receipt of an event from the event obtaining unit 121, the event providing unit 162, which is in mode C, first changes a status of the mobile phone 2 in accordance with the received event to the execution status ST5 and then provides the event to an application in the OS 160. For example, in a case where the event is generated by a user's operation of pressing a dial key, the event providing unit 162 first terminates the Java runtime environment 140 and then launches the Web browser 132, since the event is associated with the Web browser 132 in the table T2.

As a result, a status of the mobile phone 2 changes from a standby status to the execution status ST5 on which the Web browser 132 can run (steps S13-S16, and S17A). Since at this time the only possible application running in the OS 160 is the Web browser 132, the event is provided to the Web browser 132 via the event providing unit 162 and the native API 123 (step S18A). Operations to be carried out during the execution of the communication AP 131 are known to persons skilled in the art, thus description thereof is omitted.

When the event is generated by the timer 112 or the like, the event providing unit 162, which is in an operation mode C, transfers the event to the Java runtime environment 140 via the native API 123 (steps S13-S15, and S19), maintaining the status of the mobile phone 2 in a standby status, since the event is associated with the Java runtime environment 140 in the event table T2. The only possible application in the Java runtime environment 140 is the Java-AP 151, thus the event is provided to the Java AP 151 via the Java-API 141. Thereafter, the mobile phone 2 waits for an event to be generated.

When the event obtaining unit 121 receives an event used for changing a destination of subsequent events and thus outputs a switching request to the event providing unit 162, the event providing unit 162 changes the operation mode to mode A. The mode notifying unit 164 displays on the display 20 an image representing the current operation mode as being mode A (steps S13, S14, S20, and S12).

To summarize the above description, according to the second embodiment, if an operating system which is not capable of executing multiple application programs simultaneously is implemented, an event is provided to an application in accordance with a user's instruction or an operation mode changed by a user's instruction. Therefore, in a case where an application to which a generated event has to be provided is not launched, it is possible to provide the event to an appropriate application.

Modification

In the foregoing embodiments, determination on whether or not a generated event is an event used for changing a destination of subsequent events is made by the event obtaining unit 121. It is possible, however, that the event obtaining unit 121 merely transfers all the events to the event providing unit 122 or 162 and the event providing unit 122 or 162 makes the determination.

In the first embodiment, a destination of an event is determined on the basis of an operation mode, the event, and the event table T1. It is possible, however, to determine only on the basis of an operation mode. For example, upon receipt of an event from the event obtaining unit 121, the event providing unit 122, which is in mode A, launches the communication AP 131 without looking at the table T1. It is noted in this case that unless the operation mode is switched to B, the Java-AP 151 cannot receive any events. The above determination is also applied to the second embodiment. For example, it may be determined that the destination of an event in mode A is the communication AP 131, the destination in mode B is the Java runtime environment 140, and the destination in mode C is the web browser 132.

In the foregoing embodiments, association of the Java runtime environment 140 with an event is registered in the tables T1 and T2. It is possible, however, to provide an event to the Java runtime environment 140 by the event providing unit 122 or 162 in a case where an event provided by the event obtaining unit 121 is not registered.

Needless to say, it is possible to omit registrations relating to associations other than the association of the Java runtime environment 140 with the event. For example, in the first embodiment it is possible to register only events corresponding to the Java Runtime environment 140 in the table T1. In this case if an event provided by the event obtaining unit 121 to the event providing unit 122 of mode A is not registered in the table T1, the event is provided to the communication AP 131 and if the event is registered the event is provided to the Java runtime environment 140. Namely, when a potential destination of an event is a single application, it is enough to register only events in the event table.

In the foregoing embodiments, a current operation mode of the event providing unit 122 or 162 is notified to a user. It is possible, however, to omit the notification. For example, it is possible that the switching button CB changes its aspect when pressed by the user, so as to notify a user of a current operation mode. An example of the button is a toggle button which changes between two (or sometimes more) states when pressed.

In the foregoing embodiments, an operation mode is changed by pressing a single button. It is possible, however, to employ a plurality of buttons assigned for various possible operation modes. For example, a right cursor key (not shown in the figure) is assigned to mode A and a left cursor key is assigned to mode B. It is also possible to assign a control capable of providing a plurality of inputs. For example, each direction of a pointing device is assigned to an operation mode.

In the foregoing embodiments, a level of an event received by the event obtaining unit 121 is not limited. For example, the event may be an event that originated from a hardware resource or from a user interface such as a virtual button.

Although in the foregoing embodiments, the event tables are stored in the ROM 71, it is possible to store the event tables in the EEPROM 72.

Further, although in the foregoing embodiments, an operation mode of the event obtaining units is changed in a standby status, it is possible to change the mode before changing to a standby status. In this case, an operation mode in a standby status is set to a mode that is the same as a mode in the previous status. In addition, it is possible to store the operation mode in the EEPROM 72. In this case when the mobile phone is turned off, the operation mode is maintained, thus a user does not need to change to a desired mode when the mobile phone is turned on the next time.

Still further, although in the above embodiments the standby application program is implemented, it is possible to omit the implementation. In a case where the standby application program is not implemented, a destination of an event is selected from among applications which are presently executable.

Still further, although in the second embodiment, a configuration of a status transition shown in FIG. 13 is effected since the communion AP 131, the Web browser 132, and the Java runtime environment 140 which can run on the OS 120 are implemented, and it is apparent that persons skilled in the art can easily modify statuses and transition paths in accordance with applications which are further implemented.

Still further, as in the second embodiment, providing an event to the communion AP 131 is preformed in mode A and providing to the Web browser 132 is performed in mode C. However it is possible to modify the embodiment, for example, in a way that a destination in mode A is set to AP 131 and the Web browser 132 in a case where there is no conflict between events used for the AP 131 and events used for the Web browser 132. It is noted that in this case mode C can be omitted.

Although in the foregoing embodiments the mobile phone is employed, it is possible, however, to apply the invention to any electronic device capable of executing a computer program, in which device multiple applications as potential destinations of an event are implemented. Especially, the present invention is suitable for an electronic device, in which hardware resources including a memory are restricted in size on account of its portability and thus an OS which cannot handle multiple applications simultaneously is implemented.

Still further, as in the foregoing embodiments, the standby application is implemented as a Java application. Needless to say, the implementation is not limited. In contrast, it is possible to implement all applications on the OS 120 as a Java application. In this case, both the AP 131 and the web browser are java applications.

Still further, as in the foregoing embodiments the Java runtime environment is required since the standby application is a Java application. Thus, it is not necessary to implement a Java runtime environment if the standby application is not a Java application. Still further, it is possible to implement other runtime environment between the OS and the Java runtime environment.

Still further, in the foregoing embodiments, the OS software and the Java runtime environment are stored in the ROM 71. It is possible, however, to implement a function of reading/writing data from/to a storage medium such as a semiconductor memory, optical disk, magneto-optical disk, and magnetic disk, to which the OS software and/or the Java runtime environment software are stored by a product maker of the mobile phone or a communication carrier to provide to a user. Needless to say, it is possible to provide the above software via a communication network for downloading to the mobile phone. In one embodiment, almost all of the above software may be stored in the nonvolatile memory 70 and a user may obtain the rest as required.

While preferred embodiments of the present invention have been described referring to the drawings thus far, it will be understood that the above description is not intended to limit the present invention to those embodiments. On the contrary, the invention is intended to cover any other alternative defined by the appended claims.

The invention claimed is:

1. An electronic device comprising:
a memory, the memory including an operating system configured to execute only one of a plurality of applications at a time and the memory including an event table, the event table including, for each one of a plurality of operation modes, an identification of at least one corresponding one of the applications and an identification of at least one corresponding one of a plurality of events, the at least one corresponding one of the applications configured to handle the at least one corresponding one of the events; and
a central processing unit in communication with the memory, the memory including computer code executable with the central processing module, wherein the computer code comprises:
an event obtaining module executable to receive an event, the event included in the events;
a providing module executable to determine an identity of a destination application based on the event and on a current operation mode without a selection of the destination application by a user, wherein the destination application is included in the applications, the current operation mode is included in the operation modes and corresponds to which one of the applications is being executed when the identity of the destination application is determined, the providing module is further executable to provide the event to the destination application upon determination of the identity of the destination application, the providing module is executable to provide the event to the destination application when the destination application is running, and the providing module is executable to launch the destination application and subsequently provide the event to the destination application when the destination application is not running;
an input module executable to receive an instruction to change the current operation mode; and
a switching module executable to change the current operation mode according to the instruction.

2. The electronic device of claim 1, wherein the switching module includes a control executable to sequentially change the current operation mode to each corresponding one of the plurality of operation modes in response to manipulation of the control by the user.

3. The electronic device of claim 2, wherein the input module is executable to change an aspect of the control in response to the manipulation of the control by the user.

4. The electronic device of claim 1, the computer code further comprising a notification module executable to indicate the current operation mode.

5. The electronic device of claim 4, further comprising;
a first display area for use by the destination application; and
a second display area that the destination application cannot use,
wherein the notification module is executable to direct an image that represents the current operation mode to display on the second display area.

6. The electronic device of claim 1, wherein the providing module is executable to provide the event to the destination application when the electronic device is in a standby status waiting to receive events generated in the device.

7. The electronic device of claim 6, wherein when the electronic device is in the standby status, the operating system is configured to launch a predetermined application and remain in the standby status.

8. The electronic device of claim 6, further comprising:
a communication module executable to communicate via a communication network;
a program obtaining module executable to receive the destination application from the communication module,
wherein when the electronic device is in the standby status, the operating system is configured to execute the destination application and remain in the standby status.

9. The electronic device of claim 1, wherein the event is associated in the event table with at least two of the applications.

10. The electronic device of claim 9, wherein the providing module is further executable to determine the identity of the destination application from among the at least two of the applications based on a respective priority of each respective one of the at least two of the applications.

11. The electronic device of claim 1, wherein the event is generated from a timer of the electronic device.

12. The electronic device of claim 1, wherein the event is generated from a user interface of the electronic device.

13. A method comprising:
providing, in an electronic device, an operating system configured to execute only one of a plurality of applications at a time;
providing in the electronic device a plurality of operation modes, each one of the operation modes associated with at least one respective one of the applications and with at least one respective one of a plurality of events, the at least one respective one of the applications configured to handle the at least one respective one of the events;
receiving an event in the operating system;
determining with a central processing unit of the electronic device an identity of a destination application based on the event and on a current operation mode without receiving a selection of the destination application by a user, the applications including the destination application, the operation modes including the current operation mode, the current operation mode corresponding to which one of the applications is being executed in the operating system when the identity of the destination application is being determined;
launching the destination application before providing the event to the destination application in response to determining the destination application is not being executed in the operating system at a time when the event is received;
providing the event to the destination application with the central processing unit after determining the identity of the destination application;
receiving an instruction from the user to change the current operation mode; and
changing the current operation mode according to the instruction.

14. The method of claim 13, wherein determining the identity of the destination application includes determining the identity of the destination application from among at least two of the applications associated with the event.

15. The method of claim 14, wherein determining the identity of the destination application includes determining the identity of the destination application from among the at least two of the applications based on a respective priority of each respective one of the at least two of the applications.

16. The method of claim 13, wherein receiving the event includes receiving the event from a timer of the electronic device.

17. The method of claim 13, wherein the event is a first event, the method further comprising:
in response to the user pressing a dial key during execution of the destination application, the central processing unit generating a second event in the operating system;
receiving the second event in the operating system;
determining with the central processing unit that the current operation mode is associated both with a voice communication application and with the second event without receiving a selection of the voice communication application by the user, the applications including the voice communication application;
terminating with the central processing unit the destination application and launching with the central processing unit the voice communication application in response to determining with the central processing unit that the voice communication application is not executing; and
providing the second event to the voice communication application with the central processing unit.

* * * * *

UNITED STATES PATENT AND TRADEMARK OFFICE
CERTIFICATE OF CORRECTION

| | | |
|---|---|---|
| PATENT NO. | : 7,725,903 B2 | Page 1 of 1 |
| APPLICATION NO. | : 10/514686 | |
| DATED | : May 25, 2010 | |
| INVENTOR(S) | : Dai Kamiya et al. | |

It is certified that error appears in the above-identified patent and that said Letters Patent is hereby corrected as shown below:

On Title Page, item (22), delete "Filed: Jun. 14, 2005" and insert --PCT Filed: May 16, 2003--.

On Title Page, below item (22), insert --(86) PCT No. PCT/JP03/06098
§ 371 (c)(1),
(2), (4) Date: Jun. 14, 2005--.

On Title Page, below item (86), insert --(87) PCT Pub. No. WO03/098437
PCT Pub. Date: Nov. 27, 2003--.

Signed and Sealed this

Thirteenth Day of July, 2010

David J. Kappos
*Director of the United States Patent and Trademark Office*